United States Patent [19]

Kukes et al.

[11] Patent Number: 4,925,546

[45] Date of Patent: May 15, 1990

[54] HYDROCRACKING PROCESS

[75] Inventors: Simon G. Kukes; Christopher L. Marshall, both of Naperville; P. Donald Hopkins, St. Charles, all of Ill.; Albert L. Hensley, Jr., Munster, Ind.

[73] Assignee: Amoco Corporation, Chicago, Ill.

[21] Appl. No.: 406,262

[22] Filed: Sep. 12, 1989

[51] Int. Cl.$^5$ .............................................. C10G 47/20
[52] U.S. Cl. ...................................... 208/111; 502/67
[58] Field of Search ........................... 208/111; 502/67

[56] References Cited

U.S. PATENT DOCUMENTS

| | | | |
|---|---|---|---|
| 4,477,336 | 10/1984 | Scherzer | 208/111 |
| 4,486,296 | 12/1984 | Oleck et al. | 502/67 |
| 4,588,496 | 5/1986 | Scherzer | 208/120 |
| 4,612,108 | 9/1986 | Angevine et al. | 208/111 |
| 4,647,368 | 3/1987 | McGuiness et al. | 208/89 |
| 4,661,239 | 4/1987 | Steigleder . | |
| 4,689,137 | 8/1987 | Clark | 208/89 |
| 4,724,067 | 2/1988 | Raatz et al. | 502/64 |
| 4,780,436 | 10/1988 | Raatz et al. | 502/66 |
| 4,857,171 | 8/1989 | Hoek et al. | 208/111 |

*Primary Examiner*—Anthony McFarlane
*Attorney, Agent, or Firm*—Ekkehard Schoettle; William H. Magidson; Ralph C. Medhurst

[57] ABSTRACT

The present invention relates to a hydrocracking process that utilizes a catalyst that contains a combination of two ultrastable zeolite Y components providing improved naphtha yield and catalyst activity.

8 Claims, 1 Drawing Sheet

HYDROCRACKING PROCESS

BACKGROUND OF THE INVENTION

The present invention relates to a hydrocarbon conversion process. More particularly, this invention relates to the catalytic hydrocracking of hydrocarbons.

The hydrocracking of hydrocarbons is old and well known in the prior art. These hydrocracking processes can be used to hydrocrack various hydrocarbon fractions such as reduced crudes, gas oils, heavy gas oils, topped crudes, shale oil, coal extract and tar extract wherein these fractions may or may not contain nitrogen compounds. Modern hydrocracking processes were developed primarily to process feeds having a high content of polycyclic aromatic compounds, which are relatively unreactive in catalytic cracking. The hydrocracking process is used to produce desirable products such as turbine fuel, diesel fuel, and middle distillate products such as naphtha and gasoline.

The hydrocracking process is generally carried out in any suitable reaction vessel under elevated temperatures and pressures in the presence of hydrogen and a hydrocracking catalyst so as to yield a product containing the desired distribution of hydrocarbon products.

Hydrocracking catalysts generally comprise a hydrogenation component on an acidic cracking support. More specifically, hydrocracking catalysts comprise a hydrogenation component selected from the group consisting of Group VIB metals and Group VIII metals of the Periodic Table of Elements, their oxides or sulfides. The prior art has also taught that these hydrocracking catalysts contain an acidic support comprising a large-pore crystalline aluminosilicate material such as X-type and Y-type zeolites. This large-pore crystalline aluminosilicate material is generally suspended in a refractory inorganic oxide such as silica, alumina, or silica-alumina. The preferred Group VIB metals are tungsten and molybdenum while the preferred Group VIII metals are nickel and cobalt.

The prior art has also taught that combinations of metals for the hydrogenation component, expressed as oxides and in the order of hydrogenation activity, are: $NiO-WO_3$, $NiO-MoO_3$, $CoO-MoO_3$, and $CoO-WO_3$.

Other hydrogenation components broadly taught by the prior art include iron, ruthenium, rhodium, palladium, osmium, indium, platinum, chromium, molybdenum, vanadium, niobium, and tantalum.

With reference to the acidic support the prior art is replete with disclosures of zeolites suitable for incorporation into hydrocracking catalysts. For instance, U.S. Pat. No. 4,600,498 (Ward) discloses the use of faujasite, mordenite, erionite, zeolite Y, zeolite X, zeolite L, zeolite Omega, ZSM-4 and their modifications.

In accordance with the teachings of the '498 patent, a preferred zeolite is zeolite Y and its modifications as disclosed in U.S. Pat. No. 3,130,007 (Breck). These include zeolite Y in the hydrogen form and zeolite Y that has been ion-exchanged with ammonium ions and then steam stabilized.

A preferred zeolite used in hydrocracking catalysts is the ultrastable zeolite type Y. These zeolites generally maintain their crystalline structure during high temperature and steam treatments. The subject zeolites are further characterized by an $R_2O$ content of less than 1% by weight where R designates any alkali metal ion. These zeolites also possess a silica to alumina molar ratio that varies from about 3.5 to about 7 and a reduced unit cell size. The ultrastable zeolite type Y is typically prepared by carrying out successive base exchanges with a type-Y zeolite utilizing an aqueous solution of an ammonium salt such as ammonium nitrate until the desired low alkali metal content is achieved.

The exchanged zeolite Y is then washed and calcined in the presence of steam at about 540° C. to about 815° C. to produce an ultrastable zeolite Y. The above sequence of ion exchange followed by calcination can be repeated until the final zeolite possesses the desired alkali metal content and unit cell size.

A specific ultrastable type Y zeolite employed in hydrocracking catalysts is the ultrastable, large pore crystalline aluminosilicate material designated as Z-14 U.S. zeolite which is described in U.S. Pat. Nos. 3,293,192 (Maher et al.) and 3,449,070 (McDaniel et al.). These zeolites possess a low alkali metal content, are ammonia-free, and possess a silicon-rich framework demonstrated by a smaller unit cell size than the ammonia-exchanged zeolite Y. It should be noted that these zeolites generally possess the same amount of aluminum, however, there is less aluminum in the framework and more in the amorphous phase.

U.S. Pat. No. 4,816,538 (Abdo) further discloses the use of zeolitic molecular sieves such as ZSM-5, fluorided Y zeolites, and zeolite Beta in hydrocracking catalysts. The subject patent also generally discloses the use of nonzeolitic crystalline molecular sieves in hydrocracking catalysts such as silicoalumino-phosphates, alumino phosphates, ferrosilicates, titanium alumino silicates, borosilicates and chromosilicates.

The subject patent further discloses the use of a particular Y zeolite that has been dealuminated to achieve a silica to alumina molar ratio of above 6.0. A preferred dealuminated Y zeolite is "LZ-210" available from the Linde Division of the Union Carbide Corporation. The unit cell size is at or below 24.65 Angstroms and normally ranges between 24.20 and about 24.65 Angstroms. These zeolites have a capacity for water vapor at least 20 wt.% based on the anhydrous weight of the zeolite.

As can be appreciated from the above, there is a myriad of catalysts known for hydrocracking whose catalytic properties vary widely.

Broadly, it has now been discovered that if a precise combination of two different ultrastable type-Y zeolites are present in the hydrocracking catalyst in accordance with the present invention, both the catalyst activity and the selectivity towards naphtha can be markedly improved when carrying out a hydrocracking process. The improvements in activity or naphtha selectivity are not realized if either ultrastable zeolite Y is present alone in the hydrocracking catalyst, or if both zeolites are present in proportions not in accordance with the present invention.

SUMMARY OF THE INVENTION

Briefly, the present invention relates to a process for the hydrocracking of a hydrocarbon feedstock which comprises reacting the feedstock with hydrogen at hydrocarbon hydrocracking conversion conditions in the presence of a catalytic composite comprising a combination of a Group VIB metal component, a Group VIII metal component, and a support comprising a crystalline molecular sieve component wherein the crystalline molecular sieve component consists essentially of a first ultrastable zeolite Y wherein the silica to alumina molar ratio for the silicon and aluminum present in the crystalline framework, and not in the amorphous phase, varies from about 5 to about 8 and the unit cell size varies from about 24.667 to about 24.524 and a second relatively more dealuminated ultrastable zeolite Y wherein the framework silica to alumina ratio varies from about 8 to about 20 and the unit cell size varies from about 24.524 to about 24.343. The first ultrastable zeolite Y is present in an amount ranging from about 40 to about 80 wt. % based on the total weight of the molecular sieve component.

DETAILED DESCRIPTION OF THE INVENTION

Figure 1:
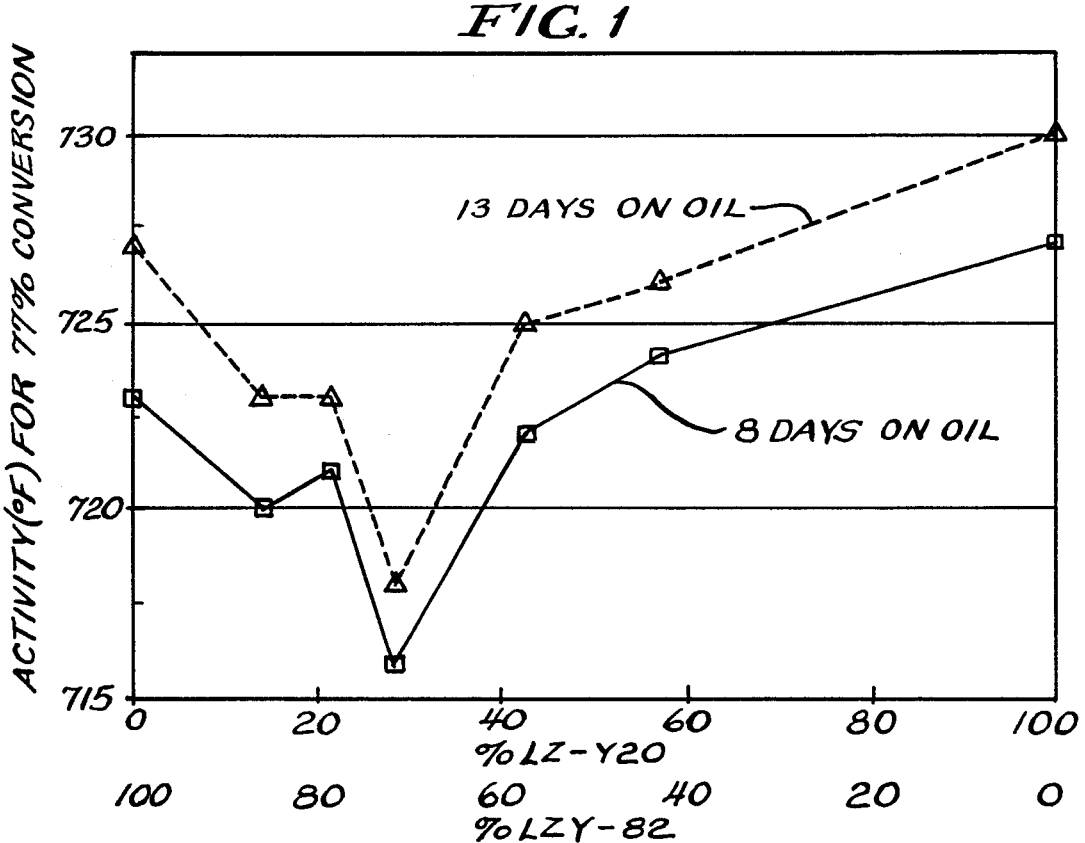
FIG. 1 depicts a plot of catalyst activity indicated by the temperature required to effect 77 wt. % conversion of the feed material boiling above 380° F. to a material boiling below 380° F. versus wt. % of the two ultrastable zeolite Y-materials described herein.

The hydrocarbon chargestock subject to hydrocracking in accordance with the process of this invention is suitably selected from the group consisting of petroleum distillates, solvent deasphalted petroleum residua, shale oils and coal tar distillates. These feedstocks typically have a boiling range above about 200° F. and generally have a boiling range between 350° to 950° F. More specifically these feedstocks include heavy distillates, heavy straight-run gas oils and heavy cracked cycle oils, as well as fluidized catalytic cracking unit feeds. The process of the invention is especially suitable in connection with handling feeds that include a light catalytic cycle oil. This light catalytic cycle oil generally has a boiling range of about 350° to about 750° F., a sulfur content of about 0.3 to about 2.5 wt. %, a nitrogen content of about 0.01 to about 0.15 wt. % and an aromatics content of about 40 to about 90 volume %. The light catalytic cycle oil is a product of the fluidized catalytic cracking process.

Operating conditions to be used in the hydrocracking reaction zone include an average catalyst bed temperature within the range of about 500° to 1000° F., preferably 700° to 900° F. and most preferably about 650° to about 850° F., a liquid hourly space velocity within the range of about 0.1 to about 10 volumes hydrocarbon per hour per volume catalyst, a total pressure within the range of about 500 psig to about 5,000 psig, and a hydrogen circulation rate of about 500 standard cubic feet to about 20,000 standard cubic feet per barrel.

The process of the present invention is preferably carried out in a single reaction zone wherein the reaction zone can comprise a plurality of catalyst beds. Each catalyst bed can have intrabed quench to control temperature rise due to the exothermic nature of the hydrocracking reactions. The charge stock may be a liquid, vapor, or liquid-vapor phase mixture, depending upon the temperature, pressure, proportion of hydrogen, and particular boiling range of the charge stock processed. The source of the hydrogen being admixed can comprise a hydrogen-rich gas stream obtained from a catalytic reforming unit.

The catalyst used in the process of the present invention comprises a hydrogenation component and a catalyst support.

The hydrogenation component of the catalysts employed in the process of the invention comprises a Group VIB metal component and a Group VIII metal component. These components are typically present in the oxide or sulfide form.

The amounts of Group VIB metals and Group VIII metals present in the catalysts are set out below on an elemental basis and based on the total catalyst weight.

|  | Broad | Preferred | Most Preferred |
|---|---|---|---|
| Group VIB | 3–30 | 6–25 | 8–20 |
| Group VIII | 0.5–10 | 1–6 | 1.5–4 |

The preferred Group VIB metals are molybdenum and tungsten, while the preferred Group VIII metals are cobalt and nickel.

When the hydrogenation component of the present invention comprises cobalt and molybdenum and/or their compounds, these metals are present in the amounts specified below. These amounts are based on the total catalytic composite or catalyst weight and are calculated as the oxides CoO and $MoO_3$.

|  | Broad | Preferred | Most Preferred |
|---|---|---|---|
| CoO, wt. % | 1–6 | 1.5–5 | 2–4 |
| $MoO_3$, wt. % | 3–20 | 6–15 | 8–12 |

When the hydrogenation component of the present invention comprises nickel and tungsten and/or their compounds. The nickel and tungsten are present in the amounts specified below. These amounts are based on the total catalytic composite or catalyst weight and are calculated as the oxides, NiO and $WO_3$. In another embodiment of the present invention, the hydrogenation component can additionally comprise a phosphorus component. The amount of phosphorus component is calculated as $P_2O_5$ with the ranges thereof also set out below.

|  | Broad | Preferred | Most Preferred |
|---|---|---|---|
| NiO, wt % | 1–10 | 1.5–5.0 | 1.5–4.0 |
| $WO_3$, wt % | 10–30 | 12–25 | 13–20 |
| $P_2O_5$, wt % | 0.0–10.0 | 0.0–6.0 | 0.0–3.0 |

The hydrogenation component may be deposed upon the support by impregnation employing heat-decomposable salts of the above-described metals or any other method known to those skilled in the art. Each of the metals may be impregnated onto the support separately, or they may be co-impregnated onto the support. The composite is subsequently dried and calcined to decompose the salts and to remove the undesired anions.

The support component of the present invention comprises a crystalline molecular sieve component containing a combination of zeolites in accordance with the present invention and a refractory inorganic oxide such as silica, alumina, or silica-alumina. The crystalline molecular sieve component is present in an amount ranging from about 10 to about 60 wt. %, preferably from about 25 to about 50 wt. % based on the total weight of the support component. Preferably, the crystalline molecular sieve material is distributed throughout and suspended in a porous matrix of the refractory oxide.

In particular, the support comprises a molecular sieve component consisting essentially of a combination of a first ultrastable zeolite Y and a second relatively more dealuminated ultrastable zeolite Y.

The first ultrastable zeolite Y is present in an amount ranging from about 40 to about 80 wt. %, most preferably from about 50 to about 75 wt. % and optimally from about 60 to about 70 wt. % based on the total weight of both the first ultrastable zeolite Y and the second relatively more dealuminated ultrastable zeolite Y in the catalyst.

One type of ultrastable, large-pore crystalline aluminosilicate material that can be employed as the first ultrastable zeolite Y is designated as Z-14US zeolite which is described in U.S. Pat. Nos. 3,293,192 (Maher et al.) and 3,449,070 (McDaniel et al.). Each of these patents is incorporated herein by reference and made a part hereof. By large-pore material is meant a material that has pores which are sufficiently large to permit the passage thereinto of benzene molecules and larger molecules and the passage therefrom of reaction products, e.g., 7 to 10 Angstroms.

The first ultrastable, large-pore crystalline aluminosilicate zeolite Y is stable to exposure to elevated temperatures. This stability in elevated temperatures is discussed in the aforementioned U.S. Pat. Nos. 3,293,192 and 3,449,070. It may be demonstrated by a surface area measurement after calcination at 1,725° F. In addition, the ultrastable, large-pore crystalline aluminosilicate zeolite Y material exhibits extremely good stability toward wetting, which is defined as the ability of a particular aluminosilicate material to retain surface area or nitrogen-adsorption capacity after contact with water or water vapor.

The ultrastable, large-pore crystalline aluminosilicate zeolite Y material that is employed as the first ultrastable zeolite Y in accordance with this invention exhibits hydroxyl infrared bands that distinguish it from other aluminosilicate materials. The hydroxyl infrared bands obtained with the ultrastable, large-pore crystalline aluminosilicate zeolite Y material are a band near 3,745 cm$^{-1}$ (3,745±5 cm$^{-1}$), a band near 3,695 cm$^{-1}$ (3,690±10 cm$^{-1}$), and a band near 3,625 cm$^{-1}$ (3,610±15 cm$^{-1}$). The band near 3,745 cm$^{-1}$ may be found on man of the hydrogen-form and decationized aluminosilicate materials, but the band near 3,695 cm$^{-1}$ and the band near 3,625 cm$^{-1}$ are characteristic of the preferred ultrastable, large-pore crystalline aluminosilicate material that is used as the first ultrastable zeolite Y in the catalyst of the present invention. The ultrastable, large-pore crystalline aluminosilicate material is characterized also by an alkali metal content of less than 1%.

The first zeolite Y is further characterized by a silica to alumina molar ratio for the silicon and aluminum present in the crystalline framework and not the amorphous phase, ranging from about 5 to about 8 and a unit cell size ranging from about 24.667 to about 24.524.

A particularly preferred first ultrastable zeolite Y is designated as "LZ-Y82" and commercially available from UOP. LZ-Y82 is characterized by a very low sodium content, about 0.2 wt. % Na$_2$O, and a unit cell size of 24.56 Angstroms. This material is further characterized by an LOI at 800° F. of 23.1 wt. %, a surface area of 770 m$^2$/g, and a (NH$_4$)$_2$O content of 4.0 wt. %. The LZ-Y82 possesses a water capacity of 27 wt. % at 4.6 Torr (25° C.). Further, the acid type catalytic activity as measured by butane cracking activity is a value (Ka) of about 30. The silicon to aluminum atomic (or silica to alumina molar) ratios for the atoms present in the crystalline framework and not the amorphous phase can be calculated from the unit cell size measurement (a$_o$) by the "Breck-Flanigen" method disclosed in D. Breck, Zeolite Molecular Sieves, pp. 92–95 (1974), this method being incorporated herein by reference. By using the subject method, the appropriate silica to alumina ratio for the LZ-Y82 is 7.0.

The second relatively more dealuminated ultrastable zeolite Y present in the molecular sieve component in accordance with the present invention is characterized by a higher framework silica to alumina molar ratio and a lower unit cell size than the first ultrastable zeolite Y. Specifically, the second ultrastable zeolite Y is characterized by a unit cell size ranging from about 24.524 to about 24.343 Angstroms, and a framework silica to alumina molar ratio of about 8 to about 20. Preferably, the unit cell size ranges from 24.387 to 24.343 Angstroms which corresponds to a framework silica to alumina molar ratio of about 15 to 20. All of the framework silica to alumina ratios were calculated by the above-mentioned Breck-Flanigen equation.

The second ultrastable zeolite Y is further characterized by a water capacity of less than about 15 wt. % at 4.6 Torr (25° C.) which is substantially less than the more hydrophilic first ultrastable zeolite Y.

The dealumination of zeolites in general and ultrastable Y in particular is well known. Generally, zeolite dealumination is accomplished by chemical methods such as treatments with acids, e.g., HCl, with volatile halides, e.g., SiCl$_4$ or with chelating agents such as ethylenediaminetetraacetic acid (EDTA). Another common technique is a hydrothermal treatment of the zeolite in either pure steam or in air/steam mixtures.

U.S. Pat. No. 3,929,672 (Ward) the teachings of which are incorporated by reference similarly discloses a method for dealuminating ultrastable zeolite Y. The subject patent teaches a preparation procedure wherein a sodium zeolite Y is partially exchanged with ammonium ions, followed by steam calcination under controlled temperature and steam partial pressure followed by yet another ammonia exchange and calcination step. As mentioned above, the exchange and calcination steps can be repeated t achieve the desired degree of dealumination and unit cell size reduction.

U.S. Pat. No. 4,503,023 (Breck et al.), the teachings of which are incorporated herein by reference, discloses another procedure for dealuminating a zeolite Y involving contacting the zeolite Y with an aqueous solution of a fluorosilicate salt using controlled proportions, temperatures and pH conditions which avoid aluminum extraction without silicon substitution.

The subject patent sets out that the fluorosilicate salt is used as the aluminum extractant and also as the source of extraneous silicon which is inserted into the zeolite structure in place of the extracted aluminum. The salts have the general formula:

(A) $2/b$ SiF$_6$ 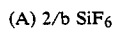

wherein A is a metallic or nonmetallic cation other than H$^+$ having the valence "b." Cations represented by "A" are alkylammonium, NH$_4^+$, Mg$^{++}$, Li$^+$, Na$^+$, K$^+$, Ba$^{++}$, Cd$^{++}$, Cu$^{++}$, H$^+$, Ca$^{++}$, Ca$^+$, Fe$^{++}$, Co$^{++}$, Pb$^{++}$, Mn$^{++}$, Rb$^+$, Ag$^+$, Sr$^{++}$, Ti$^+$ and Zn$^{++}$.

The preferred second relatively more dealuminated ultrastable zeolite Y is commercially available from UOP and is designated as "LZ-Y20." LZ-Y20 is described as a thermally stabilized, low soda, ammonia-free type Y molecular sieve possessing a unit cell size of 24.37 Angstroms. The subject zeolite has a low affinity for water, i.e. water capacity of 9 wt. % at 4.6 Torr and 25° C. as compared to the LZ-Y82 water capacity of 27 wt. %. Further specifications include a BET surface area of about 600 m²/g, and a silica to alumina molar ratio of about 16.6 as calculated by the Breck-Flanigen method.

The support component of the present invention may be prepared by various well-known methods and formed into pellets, beads, and extrudates of the desired size, for example, the first and second ultrastable zeolite Y components of the invention may each be pulverized into a finely divided material and mixed in proportions in accordance with the present invention. This zeolite mixture may be mixed with the refractory inorganic oxide. The finely divided zeolite mixture may also be admixed thoroughly with a hydrosol or hydrogel of the refractory inorganic oxide. Where a thoroughly blended hydrogel is obtained, this hydrogel may be dried and broken into pieces of desired shapes and sizes. The hydrogel may also be formed into small spherical particles by conventional spray drying techniques or equivalent means.

In a preferred embodiment of the present invention the catalyst situated at the downstream portion of the hydrocracking reaction zone possesses a small nominal size while the remaining upstream portion of the total amount of catalyst possesses a large nominal size greater than the small nominal size catalyst. Specifically, the small nominal size is defined as catalyst particles having a U.S. Sieve mesh size ranging from about 10 to 16 preferably 10 to 12. The large nominal size catalyst preferably ranges from about 5 to about 7 U.S. Sieve mesh size. Further details of this preferred embodiment are disclosed in U.S. Pat. No. 4,834,865 (Kukes et al.), the teachings of which are incorporated by reference.

Generally, the small nominal size hydrocracking catalyst is present in an amount ranging from abut 5 to 70 wt. % of the total overall amount of catalyst used in this invention. Preferably, this amount ranges from about 10 to about 60 wt. %.

The amount of small nominal size hydrocracking catalyst used in the hydrocracking stage can be limited in accordance with the desired overall pressure gradient. This amount can be readily calculated by those skilled in the art as explained in U.S. Pat. Nos. 4,796,655 (Armistead et al.) and 3,563,886 (Carlson et al.).

The present invention is described in further detail in connection with the following Example, it being understood that the example is for purposes of illustration and not limitation.

EXAMPLE

The process of the invention was carried out and compared with several processes not in accordance with the present invention.

Specifically, several catalysts were prepared in a conventional manner known to those skilled in the art wherein the amounts of the first ultrastable zeolite Y and the second more dealuminated ultrastable zeolite Y were present in the catalysts in accordance with the present invention. The first zeolie Y used in the catalysts was LZ-Y82 obtained from UOP. This particular LZ-Y82 zeolite possessed a unit cell size of 24.5707 Angstroms, which corresponds to a framework silica to alumina ratio of 6.8.

The second relatively more dealuminated zeolite Y used in the catalysts was LZ-Y20 obtained from UOP. This catalyst possessed a unit cell size of 24.3603 Angstroms, which corresponds to a framework silica to alumina ratio of 17.7.

Several comparative catalysts were also prepared wherein the proportions of the zeolites in the combination were not in accordance with the present invention. Each catalyst possesses the properties set out in Table 1 below. In the Table, catalysts C, D, E, and F are in accordance with the present invention whereas catalysts A, B, and G are comparative catalysts not in accordance with the present invention. All catalysts prepared contained 4 wt. % NiO and 18 wt. % $WO_3$ based on the total weight of the support component.

TABLE 1

| | Catalyst | | | | | | |
|---|---|---|---|---|---|---|---|
| | A | B | C | D | E | F | G |
| Support Composition, wt. % | | | | | | | |
| alumina | 65 | 65 | 65 | 65 | 65 | 65 | 65 |
| LZY-82 | 100 | 85.7 | 78.6 | 71.4 | 57.1 | 42.9 | 0 |
| LZY-20 | 0 | 14.3 | 21.4 | 28.6 | 42.9 | 57.1 | 100 |

Table 2 below sets out the properties of the feedstock, a light catalytic cycle oil used in a test run for each of the above described catalysts.

TABLE 2

| Gravity, API | 21.9 |
|---|---|
| C, % | 89.58 |
| H, % | 10.37 |
| S, % | 0.55 |
| N, ppm | 540 |
| Paraffins, % | 30.5 |
| Total Aromatics, % | 69.5 |
| Naphthalenes, % | 25.4 |
| Phenanthrenes, % | 5.2 |

Each of the comparative catalysts and invention catalysts were then tested in a hydrocracking unit at the following conditions:

Pressure: 1250 psig
$H_2$ circulation: 12,000 SCFB
Catalyst loading: 15 g diluted with alpha alumina (low surface area alumina) at a 3:1 volume ratio of alpha alumina to catalyst
WHSV: 2.7
Temperature: maintained to effect 77% conversion of material boiling over 380° F. to material boiling below 380° F.

Table 3 below sets out the results of each run. Specifically, the table sets out the yields for each product fraction which are calculated as the wt. % of the product fraction in the overall product at the specified 77 wt. % conversion of feed material boiling above 380° F. to material boiling below 380° F.

TABLE 3

| | Product Quality | | | | | | |
|---|---|---|---|---|---|---|---|
| | Catalyst | | | | | | |
| | A | B | C | D | E | F | G |
| Yields, wt. % | | | | | | | |
| Dry Gas | 4.6 | 4.4 | 4.4 | 4.0 | 3.7 | 4.0 | 3.8 |
| Butane | 13.9 | 13.8 | 13.9 | 12.7 | 12.2 | 12.9 | 13.3 |
| Pentane | 10.9 | 10.9 | 10.4 | 10.3 | 10.1 | 10.4 | 10.8 |
| Light Naphtha | 17.4 | 17.8 | 17.4 | 17.4 | 17.1 | 17.2 | 18.0 |
| Heavy Naphtha | 56.2 | 56.1 | 56.9 | 58.2 | 59.9 | 58.6 | 57.1 |
| Total Naphtha | 73.6 | 74.0 | 74.2 | 75.7 | 77.0 | 75.7 | 75.1 |
| Iso/Normal Ratios | | | | | | | |
| Butane | 1.35 | 1.46 | 1.40 | 1.45 | 1.41 | 1.41 | 1.46 |

TABLE 3-continued

| | Product Quality | | | | | | |
|---|---|---|---|---|---|---|---|
| | Catalyst | | | | | | |
| | A | B | C | D | E | F | G |
| Pentane Activity (deg F.) for 77% conversion | 2.92 | 2.65 | 2.45 | 2.55 | 2.67 | 2.81 | 2.92 |
| 8 days | 723 | 720 | 721 | 716 | 722 | 724 | 729 |
| 13 days | 726 | 723 | 723 | 718 | 725 | 727 | 730 |

FIG. 1 plots activity indicated by the temperatures required to effect 77 wt. % conversion of the feed material boiling above 380° F. to a material boiling below 380° F. versus the wt. % of the respective zeolite (LZ-Y 20 and LZ-Y 82) for each of the test runs set out in Table 2. The increase in catalyst activity is readily evident when the catalysts contain the subject zeolites in the proportions stipulated by the invention.

Figure 2:
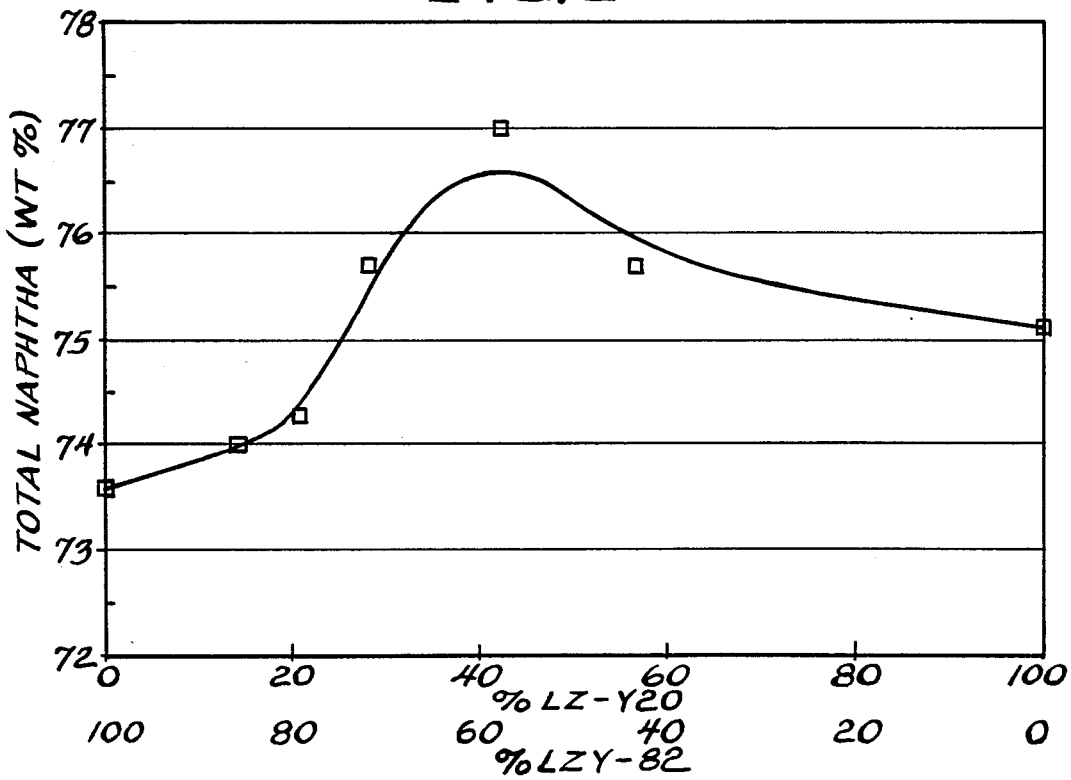
FIG. 2 depicts a plot of wt. % total naphtha yield versus wt. % of the two ultrastable zeolite Y-materials described herein.

FIG. 2 plots total naphtha yield in wt. % versus wt. % of the respective zeolites (LZ-Y 20 and LZ-Y 80). The increase in yield is clearly evident when the process of the invention is carried out where the zeolites are present in the catalyst in the stipulated proportions.

It should be noted that activity improvement is most pronounced when a greater amount of the first zeolite Y is used within the prescribed range of the present invention, whereas total naphtha yield is improved when a greater amount of the second zeolite Y is used. Thus, one practicing the invention can operate at either end of the prescribed zeolite range depending upon which property is of paramount importance.

What is claimed is:

1. A process for the hydrocracking of a hydrocarbon feedstock which comprises reacting the feedstock with hydrogen at hydrocracking conversion conditions in the presence of a catalyst comprising a hydrogenation component comprising a Group VIB metal component and a Group VIII metal component and a support component comprising a refractory inorganic oxide component and a crystalline molecular sieve component wherein the crystalline molecular sieve component consists essentially of a first ultrastable zeolite Y wherein the framework silica to alumina molar ratio varies from about 5 to about 8 and the unit cell size varies from about 24.667 to about 24.524 Angstroms and a second more dealuminated ultrastable zeolite Y wherein the framework silica to alumina molar ratio varies from about 8 to about 20 and the unit cell size varies from about 24.524 to about 24.343 Angstroms, wherein the amount of said first zeolite Y varies from about 40 to about 80 wt. % based on the total amount of said crystalline molecular sieve component.

2. The process of claim 1 wherein the amount of said first ultrastable zeolite Y varies from about 50 to about 75 wt. % based on the total weight of said molecular sieve molecular sieve component.

3. The process of claim 1 wherein the amount of said first ultrastable zeolite Y varies from about 60 to about 70 wt. % based on the total weight of said molecular sieve component.

4. The process of claim 1 wherein said hydrogenation component comprises a nickel component and a tungsten component.

5. The process of claim 1 wherein said hydrogenation component comprises a cobalt component and a molybdenum component.

6. The process of claim 1 wherein said refractory inorganic oxide is selected from the group consisting of silica, alumina, and silica-alumina.

7. The process of claim 6 wherein said refractory inorganic oxide is alumina.

8. The process of claim 1 wherein said second more dealuminated ultrastable zeolite Y possesses a framework silica to alumina ratio of about 15 to about 20 and wherein the unit cell size varies from about 24.387 to about 24.343 Angstroms.

* * * * *